United States Patent [19]

Shupe et al.

[11] 3,945,439

[45] Mar. 23, 1976

[54] METHOD FOR OIL RECOVERY

[75] Inventors: Russell D. Shupe; Jim Maddox, Jr.; Jack F. Tate, all of Houston, Tex.

[73] Assignee: Texaco Inc., New York, N.Y.

[22] Filed: Dec. 20, 1974

[21] Appl. No.: 534,983

[52] U.S. Cl.......... 166/308; 166/305 R; 252/8.55 R
[51] Int. Cl.²..................... E21B 43/25; E21B 43/26
[58] Field of Search........ 166/305 R, 307, 273–275, 166/271, 281, 282; 252/8.55 R, 8.55 C, 8.55 D, 8.55 B

[56] References Cited
UNITED STATES PATENTS

| | | | |
|---|---|---|---|
| 3,572,440 | 3/1971 | Hutchison et al.................... | 166/307 |
| 3,659,650 | 5/1972 | Stratton.............................. | 166/275 |
| 3,791,446 | 2/1974 | Tate..................................... | 166/307 |
| 3,858,656 | 1/1975 | Flournoy et al.................... | 166/274 |

*Primary Examiner*—Stephen J. Novosad
*Attorney, Agent, or Firm*—T. H. Whaley; C. G. Ries; James F. Young

[57] ABSTRACT

The production of hydrocarbons from a subterranean hydrocarbon-bearing formation is stimulated by injecting into the formation an aqueous solution of a compound hereinafter described. The elimination of plugging of capillary openings within the formation and mineral scale deposition on production equipment due to post-precipitation of dissolved salts subsequent to treatment by means of the compound results in the substantial improvement in hydrocarbon recovery.

8 Claims, No Drawings

METHOD FOR OIL RECOVERY

FIELD OF THE INVENTION

This invention relates to a method for stimulating the production of fluids from earthen formations. More particularly, this invention relates to a method in which the productivity of a hydrocarbon-bearing formation is improved upon treatment of the formation with an aqueous solution of a compound later described, said compound effecting the elimination of plugging of capillary openings due to post-precipitation of sparingly soluble salts, effecting elimination of mineral scale on production equipment such as pumps, tubing, etc., caused by such precipitation, and effecting enhanced oil recovery by reduction of retentive forces of capillarity.

DESCRIPTION OF THE PRIOR ART

The technique of increasing the deliverability of a subterranean hydrocarbon-bearing formation by injection of water and thereby stimulating the production of fluids therefrom has long been practiced in the art. The technique is applicable in both limestone and sandstone. In the usual treatment procedure, the aqueous medium is introduced into the well and under sufficient pressure is forced into the adjacent subterranean formation where it dissolves formation components, particularly the carbonates such as calcium carbonate and magnesium carbonate.

During the stimulation process passageways for fluid flow are created or existing passageways therein are enlarged thus stimulating the production of oil, water, brines and various gases. If desired, the stimulation may be carried out at an injection pressure sufficiently great to create fractures in the strata or formation which has the desired advantage of opening up passageways into the formation along which the aqueous medium can travel to more remote areas from the well bore.

There are, however, troublesome complications attending the use of this process. After stimulation is completed, the well is put back on production. The sparingly soluble carbonates, dissolved at the higher reservoir temperatures, may re-precipitate as temperature and hence solubility decrease. Such precipitation, when it occurs within the capillaries of a tight formation or on the tubing or annulus as a mineral scale, can severely lessen production rate by plugging such capillaries or well equipment. In actual practice, the short-lived effectiveness of some stimulations is attributed to salt redeposition.

In addition, with the exception of increasing the drainage area, and therefore the average permeability by matrix dissolution or hydraulic fracturing, little benefit is obtained. The complete immiscibility of the oil in the water and the retentive forces of capillarity which maintain the oil in the matrix severely limit the production of incremental oil by mere injection of water alone.

It is therefore, the principal object of the present invention to overcome the defects of the prior art in treating fluid-bearing formations such as hydrocarbon-bearing formations, etc., by providing a method of and composition for stimulation employing the novel composition of this invention.

SUMMARY OF THE INVENTION

This invention encompasses and includes a method for increasing the production of fluids from a subterranean fluid-bearing formation comprising injecting down the well bore to said formation and therefrom into said formation under a pressure greater than the formation pressure an aqueous solution of a compound hereinafter more fully described, optionally containing a propping agent therewith, maintaining said aqueous solution in contact with the formation strata for a time sufficient for the compound to chemically interact with the components of the formation.

The novel method of this invention uses an aqueous solution having dissolved therein a compound hereinafter described. The concentration of the compound present in the aqueous solution is such that it is capable of interacting with the soluble components of the fluid-bearing strata so as to prevent reprecipitation of sparingly soluble salts and enhance oil production by reducing retentive forces of capillarity.

DETAILED DESCRIPTION OF THE INVENTION

In its broadest embodiment the method for the present invention comprises introducing into a subsurface formation an aqueous solution of a compound hereinafter described wherein the said solution is maintained in contact with the formation for a time sufficient to chemically interact with the formation so as to increase substantially the oil-producing efficiency of the formation by reducing interfacial tension and hence retentive forces of capillarity. The selection of the correct compound to effect such a reduction in interfacial tension is based upon the formation water salinity, hardness, temperature and other operating variables. This selection may be made basis laboratory displacement tests.

An advantage resulting from the employment of the method of this invention in stimulating fluid-bearing formations is that the post-precipitation of dissolved carbonates is prevented or materially decreased. Such post-precipitation occurs because the salts become less soluble as temperatures decrease. Such a decrease occurs as the fluids near the production equipment. Such postprecipitation occurring within the formation matrix near the bore hole can decrease permeability by plugging the formation capillaries, particularly those near the well bore, and result in a lower production rate. Furthermore, such post-precipitation can occur in the tubing or annulus of the well itself and manifest itself as mineral scale, reducing their diameter(s) and resulting in a lower production rate.

The compound used in preparing the aqueous solution of the present invention is a water-soluble sulfonated, ethoxylated, alkylphenol, having the following general formula:

wherein R is alkaryl, containing from about 6 to 18 carbon atoms in the alkyl portion thereof, n is a number from one to 10 including fractions, and $A^+$ is a monovalent cation such as sodium, potassium or ammonium, including mixtures.

Representative examples useful in the practice of the invention include the straight and branched chain alkylphenols such as the hexyl-, isohexyl-, heptyl-, octyl-, isooctyl, nonyl-, decyl-, dodecyl-, tridecyl-, tetradecyl-, and hexadecyl-, species, containing one or more ethoxy groups attached to the alkylphenols; for example, the di-, tri-, tetra-, penta-, hexa-, octa-, nona-, and decaethoxy compounds which have been sulfonated. A preferred group of compounds include the sodium and ammonium salts of sulfonated $C_8-C_{16}$ alkylphenols containing from about 3 to about 10 ethoxy groups therein.

The concentration of the compound in the aqueous solution can vary from about 0.005 to about 2% by weight, preferably from about 0.05 to about 1% by weight.

In carrying out the method of this invention an aqueous solution is prepared by mixing the compound with water at the desired concentration. The thus-prepared aqueous solution is forced, usually via a suitable pumping system, down the well bore and into contact with the production equipment and formation to be treated. As those skilled in the art will readily understand, the pressure employed is determined by the nature of the formation, viscosity of the fluid, and other operating variables. The stimulation method of this invention may be carried out at a pressure sufficient merely to penetrate the formation or it may be of sufficient magnitude to overcome the weight of the overburden and create fractures in the formation. Propping agents, to prop open the fractures as created, for example 20 to 60 mesh sand, in accordance with known fracturing procedures, may be employed in admixture with the aqueous solution of the compound. The solution is best kept in contact with the formation and production equipment until the compound can adsorb upon the formation matrix. After this, the well is returned to production.

In the method of this invention, the compound in the aqueous solution provides means whereby calcium ions having tendencies to precipitate as $CaCO_3$ or $CaSO_4$ from a super-saturated solution of $CaCO_3$, $Ca(HCO_3)_2$ or $CaSO_4$ that is produced by the reaction of the aqueous system with the formation, does not precipitate from the spent treating solution. This binding up of the aforementioned calcium ions from weakly ionizable compounds permits the formed calcium-compound complex to remain dissolved in the treating solution and pass through the formation pores and production equipment.

Further, the compound of the invention provides means whereby the nucleation and growth of the solid itself is thwarted, so that solid calcium carbonate does not precipitate from the spent treating solution.

Further, the compound of the invention provides means whereby continuous protection against post-precipitation of $CaCO_3$, or $CaSO_4$ is obtained for a considerable period of time subsequent to treatment due to continuous slow desorption of the component from the formation surfaces. In contrast, use of surfactants having merely dispersant and suspending properties and not possessing the capability of molecularly binding up these produced calcium ions or thwarting the nucleation and growth of the solid $CaCO_3$ will permit deposition of calcium carbonate or calcium sulfate to occur from such treating solution with the likelihood of plugging the formation passageways and production equipment during subsequent recovery of desirable formation hydrocarbons therethrough. Finally, the compound of the invention reduces the retentive forces of capillarity within the formation providing enhanced oil recovery over treatment with water alone.

Following is a description by way of example of the method of the invention.

EXAMPLE I

A producing well in the Lincoln Southeast Field is treated in the following manner.

A treating mixture is prepared by mixing 10,000 gallons of source pond water containing about 200,000 ppm of total dissolved solids with 100 gallons of the compound, sulfonated pentaethoxy nonylphenol, sodium salt. Fifteen thousand pounds of frac sand is added to the aqueous surfactant admixture. The treating mixture is introduced into the formation at a rate of about 7 BPM at 3000 psig. The shut-in tubing pressure is 2500 psig which bled down to zero in a short time. The well is shut in for 13 hours and then returned to production. Estimated production rate increase is from 50 BOPD to 300 BOPD.

EXAMPLES II–IV

The procedure of Example I is repeated using

Example II - Sulfonated pentaethoxy dodecylphenol, sodium salt.

Example III - Sulfonated pentaethoxy pentadecylphenol, sodium salt.

Example IV - Sulfonated heptaethoxy pentadecylphenol, sodium salt.

It is significant that the compounds are effective in the presence of high calcium ion concentrations to 1% by weight or more, and particularly and somewhat uniquely in applications where high aqueous solution temperatures are encountered such as above 100°C. Laboratory tests reveal the compound of Example II remained 97.5% active after exposure of its aqueous solution of a temperature of 177°C. for 5 days.

The disclosed compositions may be prepared in the following manner:

The polyethoxy alkylphenol is treated with thionyl chloride for about 18 hours at about 100°C., to form the monochloro derivative, followed by reaction of said monochloro derivative with sodium sulfite for about 18 hours at about 155°C., in a 1/1 by volume admixture of water and ethanol in a Paar Bomb. The resulting recovered sulfonated product, on analysis, showed about 75% sulfonation of the terminal ethoxy group. This method of preparation is exemplary only, but was the method employed to prepare the tested compositions. Those skilled in the art may perceive other synthetic schemes. For example, a sulfated ethoxylated alkylphenol may be treated with sodium sulfite at 200°C. for about 10–12 hours, resulting in relatively high yields (75–80%) of the desired sulfonated ethoxylated alkylphenol. Direct reaction of the ethoxylated alkylphenol and mixtures thereof with such reagents as sulfuric acid or chlorosulfonic acid results in sulfation.

Obviously, other modifications and variations of the invention as hereinbefore set forth may be made without departing from the spirit and scope thereof and therefore only such limitations should be imposed as are indicated in the appended claims.

We claim:

1. Method of increasing and sustaining the production of fluids from a subterranean fluid-bearing formation comprising injecting down the well bore penetrating said formation and injecting therefrom into said formation under a pressure greater than the formation pressure, an aqueous solution consisting essentially of water and a sulfonated, ethoxylated compound having the general formula:

wherein R is alkaryl, containing from about 6 to about 18 carbon atoms in the alkyl portion thereof, $n$ is a number from one to about 10 including fractions, and $A^+$ is a monovalent cation selected from the group sodium, potassium, and ammonium, including mixtures.

2. Method as claimed in claim 1, wherein said compound is present in said aqueous solution in an amount of from about 0.05 to about 1% by weight.

3. Method as claimed in claim 1, wherein said compound is the sodium salt of sulfonated pentaethoxy dodecylphenol.

4. Method as claimed in claim 1, wherein said compound is the sodium salt of sulfonated pentaethoxy m-pentadecylphenol.

5. Method as claimed in claim 1, wherein said compound is the sodium salt of sulfonated heptaethoxy m-pentadecylphenol.

6. Method as claimed in claim 1, wherein a frac sand is also present in said solution.

7. Method as claimed in claim 1, wherein the said aqueous solution is injected down the well bore penetrating said formation under a pressure greater than the formation pressure and sufficient to create fractures in the formation.

8. Method as claimed in claim 1, wherein the said aqueous solution is injected down the well bore penetrating said formation under a pressure greater than the formation pressure but less than the pressure required to create fractures in the formation.

* * * * *